United States Patent [19]

Tanaka et al.

[11] Patent Number: 4,818,381

[45] Date of Patent: Apr. 4, 1989

[54] APPARATUS FOR SUPPLYING ELECTRONIC PARTS HAVING POLARITY

[75] Inventors: Satoru Tanaka; Seizou Takada; Tamiaki Matsuura, all of Kanagawa, Japan

[73] Assignee: Sony Corporation, Tokyo, Japan

[21] Appl. No.: 66,067

[22] Filed: Jun. 24, 1987

[30] Foreign Application Priority Data

Jun. 25, 1986 [JP]  Japan .................................. 61-149193

[51] Int. Cl.⁴ ..................... B07C 5/344; B65G 47/24; G01R 31/26
[52] U.S. Cl. .................................... 209/573; 198/395; 198/399; 324/158 D; 324/158 F
[58] Field of Search ............... 209/538, 540, 542, 545, 209/571, 573-575; 324/158 D, 158 F; 198/394, 395, 398, 399

[56] References Cited

U.S. PATENT DOCUMENTS

| 2,845,164 | 7/1958 | Stahl | 198/394 |
| 2,895,106 | 7/1959 | Taunt | 324/158 D |
| 3,281,692 | 10/1966 | Beroset | 324/158 D |
| 3,447,662 | 6/1969 | House | 198/399 X |
| 3,517,795 | 6/1970 | Dixon | 198/395 |
| 3,575,291 | 8/1971 | Hurst | 209/573 |
| 4,619,356 | 10/1986 | Dean et al. | 198/399 X |

FOREIGN PATENT DOCUMENTS

| 59-129499 | 7/1984 | Japan . | |
| 61-12514 | 1/1986 | Japan | 198/399 |
| 61-116673 | 6/1986 | Japan | 324/158 D |
| 1195307 | 11/1985 | U.S.S.R. | 324/158 D |

OTHER PUBLICATIONS

*Testing and Sorting Apparatus*, R. M. Filek, P. L. Herr, D. M. Large Western Electric Technical Digest No. 35, July 1974.

Primary Examiner—Robert B. Reeves
Assistant Examiner—Edward M. Wacyra
Attorney, Agent, or Firm—Hill, Van Santen, Steadman & Simpson

[57] ABSTRACT

An apparatus for supplying electronic parts of having a polarity has a first rotating member which has a parts receiving hole for receiving electronic parts one by one supplied from a parts receiving hole so as to detect the polarity of the electronic part accommodated in the parts receiving hole, a second rotating member having a through hole is inserted, and apparatus for preventing the electronic part from passing through the through hole in the midst thereof due to signals generated in a detector including the electrodes, whereby the electronic part is delivered directly, when the electronic part pases through the through hole, and delivered after the second rotating member is rotated to a predetermined position, when the electronic part is prevented from passing through the through hole, so that the electronic part having polarity can be delivered in the order of a predetermined polarity sense.

2 Claims, 6 Drawing Sheets

| Conduction Check | | Judgement | Continued to |
|---|---|---|---|
| between electrodes 27 & 29 | between electrodes 28 & 30 | | |
| 1 | 0 | Normal Direction | Ⓧ |
| 0 | 1 | Reverse Direction | Ⓨ |
| 1 | 1 | NG1 | Ⓩ |
| 0 | 0 | NG2 | |

APPARATUS FOR SUPPLYING ELECTRONIC PARTS HAVING POLARITY

BACKGROUND OF THE INVENTION

1. Field of the Invention

This invention relates generally to an apparatus for supplying electronic parts having a polarity, more particularly is directed to the means thereof, that is, to the structure, by which the electronic parts having polarity among chip-type electronic parts, such as MELF diodes, or the like, are arranged in the order of a predetermined polarity sense and supplied to printed circuit boards.

2. Description of the Prior Art

Electronic parts mounted on printed circuit boards, such as resistances, condensers, diodes, etc. are recently being changed from parts having lead wires to chip-type parts having no lead wires. The chip-type electronic parts which are constant in shape and size, independently of the kind of electronic part, are convenient to mount in predetermined positions on the printed circuit board by an automatic parts supplying device.

The applicant for patent for the present invention has already disclosed such a device for supplying the chip-type parts, for example, in Japanese Patent opening No. 59-129499.

In the disclosed device, the chip-type electronic parts stored in a magazine are taken out one by one and arranged in order in a pipe. And then the arranged parts are fed one by one out of the pipe and conveyed to predetermined positions on a printed circuit board by a parts gripper.

Included in the chip-type electronic parts are parts which have a polarity, such as MELF diodes or the like, and such parts having the polarity must be mounted on the printed circuit board with consideration for their polarity. In the above-mentioned automatic parts supplying device, the electric parts must, therefore, be fed out of the pipe in the predetermined polarity sense, and further, defective parts and non-conforming parts must be detected to be eliminated.

Thus, rendered indispensably necessary for the apparatus for supplying electronic parts having a polarity, is a device by which the parts taken out of the magazine are discriminated so as to arrange the parts on the order of a predetermined polarity sense, and the defective parts and non-conforming parts are detected so as to sort them out from the non-defective parts.

Various devices have been proposed hithereto. However, the conventional devices are very complicated in stucture and are on a large scale, so that their consumption of electric power is large, and further, their reliability is low. In addition, it is not easy to change the sense of the polarity of the electronic parts which are fed out of the pipe.

OBJECTS AND SUMMARY OF THE INVENTION

Accordingly, it is an object of the present invention to provide an apparatus in which the polarity of the electronic parts is detected and the parts are fed in the order of a predetermined sense, independently of the sense in which they are introduced to the apparatus.

Another object of the invention is to provide an apparatus for supplying electronic parts having a polarity, the apparatus being simple in structure, compact, and having high reliability.

A further object of the invention is to provide an apparatus for supplying electronic parts having a polarity, in which defective parts and non-conforming parts are detected due to signals generated in a detector.

DETAILED DESCRIPTION OF A PREFERRED EMBODIMENT

Figure 1:
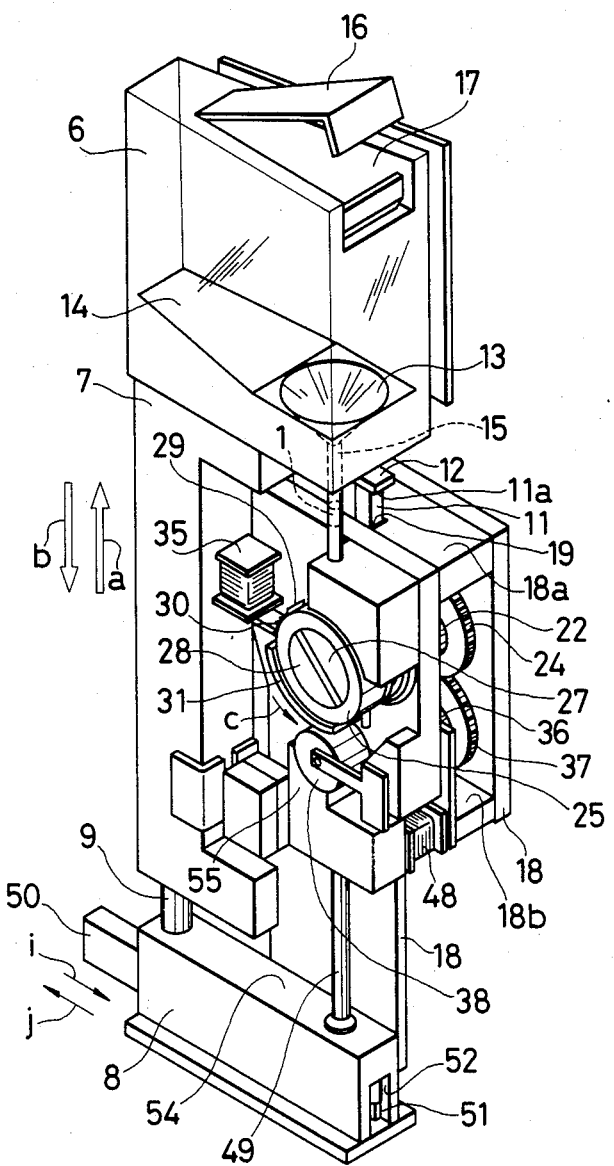
FIG. 1 is a perspective view of an apparatus for supplying electronic parts according to an embodiment of this invention.
Figure 2:
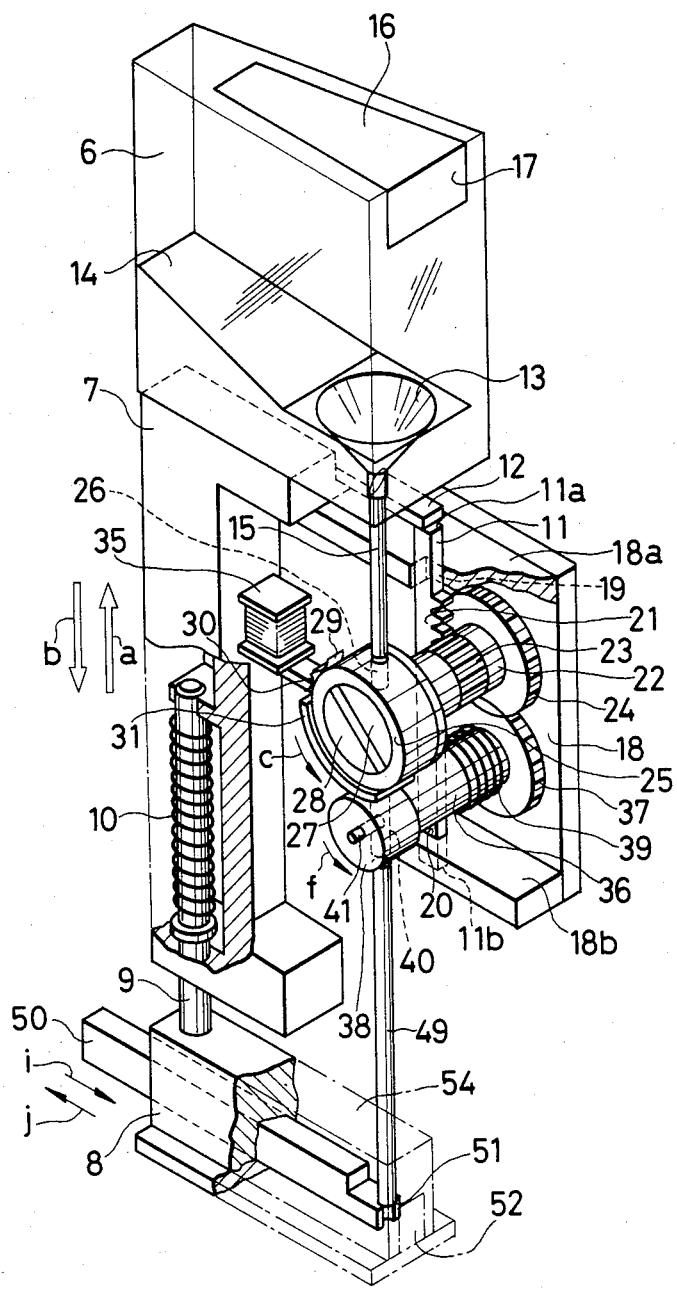
FIG. 2 is a perspective view of the internal structure of the apparatus of FIG. 1, in which the housing or the like of the apparatus is removed.

FIG. 1 shows an appearance of a parts supplying apparatus having a discrimination mechanism for determining the polarity of chip-type electronic parts, and a detection mechanism for detecting defective parts and non-conforming parts. In FIG. 2, the housing or the like of the apparatus of FIG. 1 is removed so as to illustrate the principal internal structure of the apparatus.

In practice, a large number of units, each of which comprises the apparatus of FIG. 1, are arranged in a circle and the units are selectively operated. As the mechanism necessary for the above practice has already been disclosed in the specification of the above identified prior application, a detailed explanation for the mechanism will be omitted.

Figure 6:
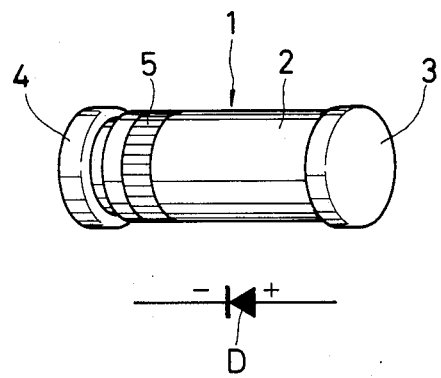
FIG. 6 is a perspective view of a MELF diode handled by the apparatus of FIG. 1.

In the embodiment, MELF diodes 1 as shown in FIG. 6 (hereinafter "diodes") are handled as the chip-type electronic parts. The diode 1 has a positive terminal 3 and a negative terminal 4 at the respective ends of a cylindrical body 2, and a mark 5 is placed on the periphery of the body 2 near the negative terminal 4 so as to make the negative terminal 4 show clearly. "D" in FIG. 6 denotes the sign of diode, the sense of which coincides with the polarity of terminals 3 and 4.

In FIGS. 1 and 2, a magazine 6 in which diodes 1 are stored is removably mounted a supporting member 7. The supporting member 7 is moved up and down together with the magazine 6 in direction of arrows a and b along a guide bar 9 which is vertically fixed to a bed 8.

The supporting member 7 is urged upwards (in the direction of arrow a) by a spring 10, but it is moved downwards (in the direction of arrow b) against the force of the spring 10 by a drive mechanism (not shown). Therefore, the supporting member 7 returns to the upper position thereof due to the force of the spring 10 as soon as the force of the drive mechanism is released.

Furthermore, a presser projection 12 is secured to the supporting member 7 in the vicinity of the upper end portion 11a of a reciprocating rod 11 so as to make the rod 11 move downwards with the member 7.

The magazine 6 is made of transparent material, such as acrylic material or the like and has a cone-shaped hopper 13 at the bottom thereof, and an inclined plane lowering toward the hopper 13. The upper end portion of a discharge pipe 15 is inserted into the hopper 13 from under the hopper 13 so as to receive the diodes 1, and a charging opening 17 with a lid 16 for supplying the diodes 1 is prepared at the top side of the magazine 6.

Thus, when the supporting member 7 and magazine 6 are moved in the direction of arrow b by the aforesaid drive mechanism after having supplied a lot of diodes 1 shown in FIG. 6 to the magazine 6 through the charging opening 17, the upper end portion of the discharge pipe 15 is relatively projected into the magazine 6, and thereby, one diode 1 falls into the discharge pipe 15 from the end mouth of the upper end portion. After that, the force of the drive mechanism is released, and the supporting member 7 and magazine 6 are returned to the original position by the force of the spring 10.

As the up-and-down motion of the supporting member 7 and magazine 6 is repeated, the diodes 1 are taken out one by one from the magazine 6 and fed to the discharge pipe 15. The diodes 1 in the pipe 15 are longitudinally lined up in the axial direction of the pipe without any concern for the polarity of the diode.

Another supporting member 18 is fixed to the bed 8, and the following parts and mechanisms of various kinds are secured to the supporting member 18. The reciprocating rod 11 is guided by guideways 19 and 20 prepared on the upper portion 18a and the lower portion 18b of the supporting member 18, respectively.

The reciprocating rod 11 is moved up and down in the direction of arrows a and b, and closely above the reciprocating rod 11, the presser projection 12 is positioned. Further, a rack 21 is integral with the reciprocating rod 11 which is meshed with a pinion 23, and the pinion 23 is fixed to a shaft 22, to which a rotary member 25 for the discrimination of polarity of the diodes 1 and a driving gear 24 are fixed. The shaft 22 is rotatably supported by the supporting member 18.

Figure 3:
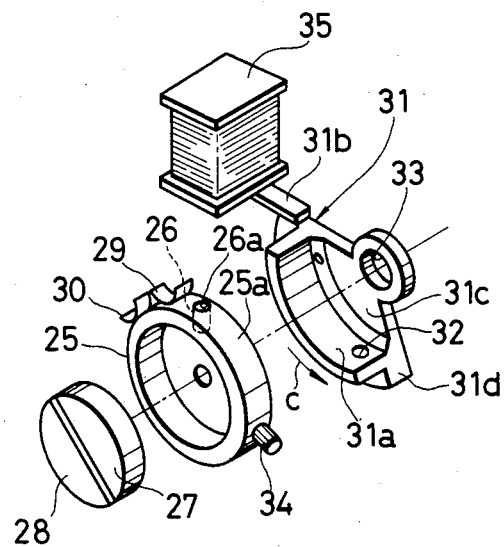
FIG. 3 is an exploded, perspective view of an important part of the apparatus of FIG. 1.

The rotary member 25 is made of electrically non-conducting material and is of annular shape as shown in FIG. 3. Further, the rotary member 25 is pierced by a parts-receiving hole 26 from the outer periphery 25a toward the center on a radius thereof.

The parts receiving hole 26 is so large in diameter as to accommodate only one diode 1 and both ends of the accommodated diode 1 protrude a little from the parts receiving hole 26. Further, the parts receiving hole 26 is positioned in opposed relation to the lower end mouth of the discharge pipe 15.

As shown in FIG. 3, a pair of semi-circular electrodes 27 and 28 are nested in the inner side of the rotary member 25, and further, another pair of electrodes 29 and 30 made of leaf springs are provided in the vicinity of the parts receiving hole 26 and elastically in contact with the periphery 25a of the rotary member 25.

The electrodes 27, 28, 29 and 30 are fixed not to the supporting member 18 but to another supporting member or the housing. The electrodes 27 and 29, and 28 and 30 placed respectively in opposed relation to each other are paired, and when the electrodes 27 and 30 are anodes the electrode 28 and 29 are cathodes. The electrodes 27, 28, 29 and 30 are connected to a detector (not shown).

A shutter 31 is prepared in the vicinity of the lower portion of the periphery 25a of the rotary member 25.

The shutter 31 comprises, as shown in FIG. 3, a circular arc portion 31a the central angle of which is about 90, a horizontal portion 31b projected from one end of the circular arc portion 31a so as to make the shutter 31 attract to a magnet 35, and a holding portion 31c disposed at a side of the circular arc portion 31a.

Furthermore, a parts-passing hole 32 is provided on the other end portion of the circular arc portion 31a, and a hole 33 is provided in the holding portion 31c so as to make the shutter 31 rotatably secure to the shaft 22.

The circular arc portion 31a surrounds the periphery 25a of the rotary member 25 from a first position above which the electrodes 29 and 30 are located, to a second position which makes about 90, at central angle with the first postion, and the shutter 31 is urged by a spring (not shown) in direction of arrow c. Further, a shutter returning pin 34 is projected from the rotary member 25 so as to make an end portion 31d of the circular arc portion 31a push against the spring, and the horizontal portion 31b is attracted by the magnet 35.

Provided in parallel with the shaft 22 is another shaft 36 to which a driven gear 37 and a part-overturning member 38 are fixed. The shaft 36 is urged due to the force of a torsion spring 39 in direction of arrow f.

Figure 4:
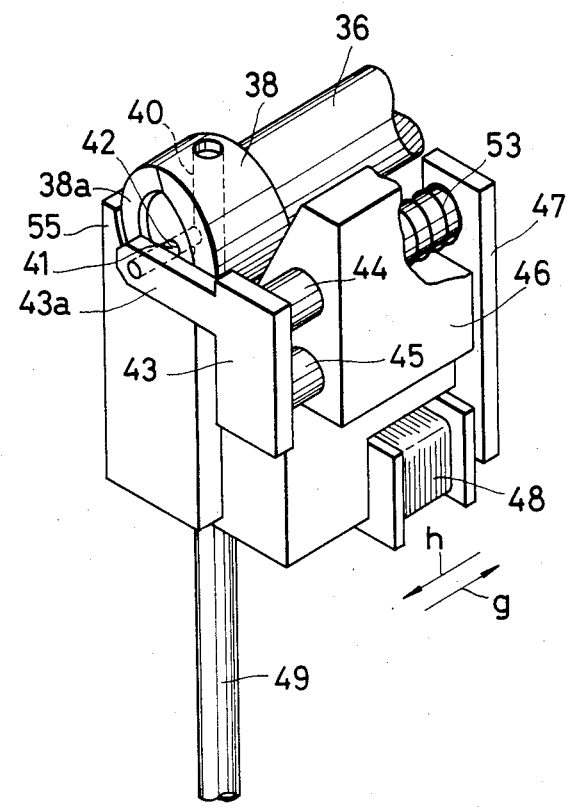
FIG. 4 is a perspective view of another important part of the apparatus of FIG. 1.

As shown in FIG. 4, the parts over turning member 38 secured to an end of the shaft 36 is pierced by a parts receiving hole 40 in the diametral direction thereof from its periphery, and an insertion hole 42 for a pin 41 is provided at the center of the parts overturning member 38. The insertion hole 42 makes a right angle with and communicates with the parts receiving hole 40, and a cam portion 38a which raises and lowers in the axial direction of the parts overturning member 38 is formed on the front face of the member 38.

The pin 41 is secured to the supporting portion 43a of a pin supporting plate 43 which is fixed to the ends of guide rods 44 and 45. The supporting portion 43a is also engaged with the cam portion 38a.

The guide rods 44 and 45 are so carried by a supporting member 46 as to be movable in direction of arrows g and h, and an armature 47 is attached to the other ends of the guide rods 44 and 45 and attracted by an electromagnet 48. Further, a compression spring 53 surrounds the guide rod 44 between the supporting member 46 and armature 47, and a member 55 for preventing the diodes 1 from dropping is provided near the lower periphery of the parts-overturning member 38.

Vertically extended from the bed 8 is a storage pipe 49 for storing the diodes 1 whose polarity has been discriminated. The upper end mouth of the pipe 49 is arranged in opposed relation to and in the vicinity of the lower end mouth of the parts receiving hole 40 in the parts overturning member 38, and a parts pusher 50 is so provided in the bed 8 as to be movable in direction of arrows i and j. The parts pusher 50 is driven by a drive mechanism (not shown) and has a parts gripper 51 at the end thereof. Further, the lower end mouth of the pipe 49 is arranged in opposed relation to and in the vicinity of the parts gripper 51.

When the parts pusher 50 is moved in the direction of arrow i, the parts gripper 51 is protruded outwards from a parts discharge opening 52 provided in the bed 8. Further, a defective or non-conforming parts storage space 54, which is covered by a housing (not shown), is provided in the bed 8.

Now, the function of the above-mentioned construction discriminating the polarity of the parts and detecting the defective or non-conforming parts, will hereinafter be described on referring to FIGS. 1 to 5J.

A charge of diodes supplied to the magazine 6 through the charging opening 17 slip down along the inclined plane 14 and are gathered in the hopper 13, so that the diodes 1 in the hopper 13 fall one by one into the pipe 15 as the supporting member 7 is moved up and down in the direction of arrows a and b together with the magazine 6 by the aforesaid drive mechanism.

When the supporting member 7 and magazine 6 are moved downwards after the first one among the diodes 1 which has fallen into the pipe 15 is transferred from the pipe 15 to the parts receiving hole 26 of the rotary member 25, the presser projection 12 presses downwards on the upper end portion 11a of the reciprocating rod 11, so that the reciprocating rod 11 is moved downwards together with the rack 21.

The movement of the reciprocating rod 11 is then transmitted to the shaft 22, driving gear 24 and rotary member 25 through the pinion 23 meshed with the rack 21, and further, transmitted to the shaft 36 and parts overturning member 33 through the driven gear 37 meshed with the driving gear 24.

The rotary member 25 having one diode 1 in the parts receiving hole 26 thereof as shown in FIG. 5 is rotated in the direction of arrow c, and simultaneously, the parts overturning member 38 is also rotated in the direction of arrow e. At that time, the pin 41 does not project into the parts receiving hole 40.

Figures 5A, 5B, 5C:
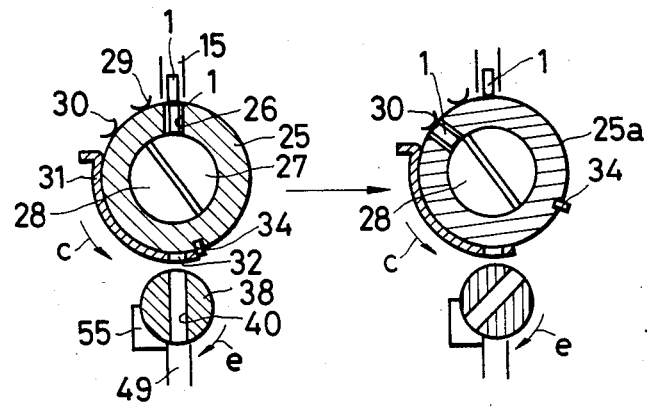
FIG. 5A through FIG. 5J is a chain of sectional side view of the important parts illustrated in FIGS. 3 and 4 to clarify the functions of the important parts.

As the rotary member 25 rotates, the diode 1 in the parts receiving hole 26 first passes between the electrodes 27 and 29, so that the terminals 3 and 4 of the diode 1 come in contract with the electrodes 27 and 29, respectively, and then passes between the electrodes 28 and 30, so that the terminals 3 and 4, come in contact with the electrodes 28 and 30 as shown in FIG. 5B, respectively. At that time, the horizontal projection 31b of the shutter 31, and the armature 47 attached to the rods 44 and 45 are attracted to the respective electromagnets 35 and 48 to which electric currents are being supplied.

In the embodiment as shown in FIG. 5C, the diode 1 in the parts receiving hole 26 is judged to be in a normal sense when conduction takes place between the electrodes 27 and 29, and to be in a reverse sense when conduction takes place between the electrodes 28 and 30. Further the diode 1 is judged to be defective when conduction takes place or does not take place both between the electrodes 27 and 29, and between the electrodes 28 and 30 (such states are denoted by sign $NG_1$ or $NG_2$, in FIG. 5C.

Incidentally, when the judgment is $NG_1$ or $NG_2$, the diode 1 in the parts receiving hole 26 is really defective, or a part different from diode 1 is accommodated in the parts receiving hole 26. For example, if a resistance is accommodated in the parts receiving hole 25, conduction takes place both between the electrodes 27 and 29 and between the electrodes 28 and 30, and if a condensor is accommodated in the parts receiving hole 26, conduction does not take place both between the electrodes 27 and 29, and between the electrodes 28 and 30.

Figure 5H:
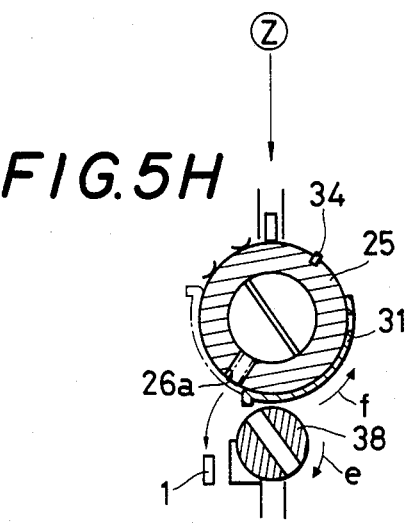
Figure 5D:
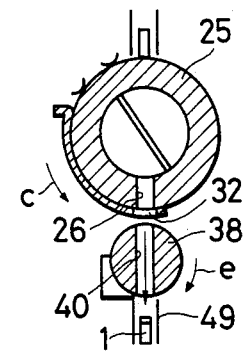

When the diode 1 is judged to be in the normal sense, the step proceeds from FIG. 5B to FIG. 5D, and when the diode 1 is judged to be in the reverse sense, the step proceeds from FIG. 5B to FIG. 5F. Further, when the diode 1 is judged to be $NG_1$ or $NG_2$, the step proceeds from FIG. 5B to FIG. 5H.

1. When the diode is judged to be in the normal sense

The rotary member 25 and the parts overturning member 38 shown in FIG. 5B are successively rotated in the directions of arrows c and e, respectively. During rotation of the rotary member 25, the next diode 1 in the discharge pipe 15 is prevented from falling, as the diode 1 abuts against the periphery 25a of the rotary member 25.

When the member 25 and 38 are rotated by an angle of 180, or so as shown in FIG. 5D, the parts receiving hole 26 of the member 25 is in alignment with the parts-passing hole 32 of the shutter 31, parts receiving hole 40 of the member 38, and the mouth of the storage pipe 49 in the vertical direction, so that the diode 1 in the parts receiving hole 26 falls, and after passing through the pipe 49, the diode 1 is gripped by the parts gripper 51 which is arranged under the pipe 49.

Thereafter, the supporting member 7 and magazine 6 are raised. The members 25 and 38 are rotated by an angle of 180, or so in directions of arrows d and f as shown in FIG. 5E, respectively, so that the parts receiving hole 26 is returned to the original position, and the next diode 1 in the pipe 15 falls into the parts receiving hole 26.

Furthermore, the parts pusher 50 is moved in direction of arrow i so as to make the parts gripper 51, which grips the diode 1, project from the parts discharge opening 52, and then, a parts carrying head (not shown) approaches to the parts gripper 51 to receive the diode 1, and carries the diode 1 to the predetermined position in the printed circuit board.

2. When the diode 1 is judged to be in the reverse sense

The current to the electromagnet 48 is switched off, so that the armature 47 is not attracted. Thus, the pin supporting plate 43 is moved in direction of arrow g as shown in FIG. 4 by the compression spring 53, so that the pin supporting plate 43 abuts against the lower part of the cam portion 38a, and simultaneously, the pin 41 fitted in the insertion hole 42 is projected into the parts receiving hole 40.

Figure 5F:
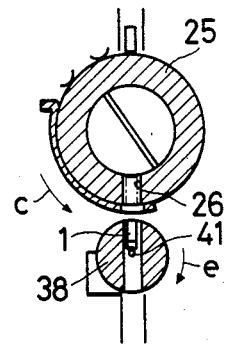
Figure 5I:
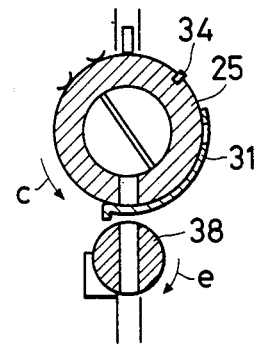
Figure 5E:
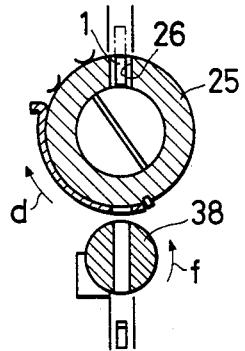
Figure 5G:
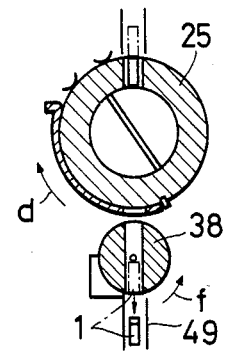

Therefore, the diode 1 falling from the parts receiving hole 26 is prevented by the pin 41 from falling through the hole 40 as shown in FIG. 5F, and when the parts overturning member 38 is rotated in the direction of arrow f to return to its original position, the diode 1 falls into the storage pipe 49 as shown in FIG. 5G. That is, as the diode 1 accommodated in the reverse sense in the parts receiving hole 26 is made to stop falling with the pin 41 and rotated at an angle of about 180, the diode 1 is fed to the storage pipe 49 after changing the sense from reverse to normal.

3. When the diode 1 is judged to be in $NG_1$ or $NG_2$

The current to the electromagnet 35 is switched off, so that the horizontal portion 31b of the shutter 31 is not attracted, and thereby, the shutter 31 is rapidly rotated at an angle of about 90, in the direction of arrow f in FIG. 5H by the force of a spring (not shown), and located in the postion indicated in solid lines in FIG. 5H.

As the rotating speed of the rotary member 25 is slower than that of the shutter 31, the shutter 31 has been moved ahead of the movement of the rotary member 25, so that the mouth 26a of the parts receiving hole 26 located in the outer periphery 25a of the rotary member 25 is opened without any interference of the shutter 31.

Hence, when the rotary member 25 is rotated to the position where the parts receiving hole 26 is inclined as shown in FIG. 5H and the mouth 26a of the parts receiving hole 26 faces downward, the diode 1 (or other parts) falls from the parts receiving hole 26 and is accommodated in the defective and non-conforming parts storage space 54.

Figure 5J:
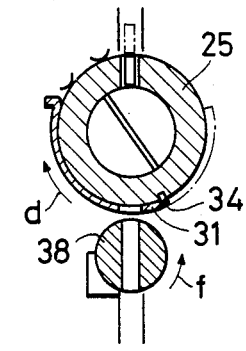

Thereafter, the members 25 and 38 are rotated to the positions shown in FIG. 5I, and then reversely rotated in the direction of arrows d and f to be returned to the original positions, respectively. At that time, the end portions 31d, of the shutter 31 are pushed by the shutter returning pin 34, so that the shutter 31 is also returned to the original positions, respectively. At that time, the end portions 31d of the shutter 31 is pushed by the shutter returning pin 34, so that the shutter 31 is also returned to the original position and then, the horizontal portion 31b of the shutter 31 is attracted by the electromagnet 35 as shown in FIG. 5J, as the electric current is again supplied to the electromagnet 35.

Thus, the diodes 1 in the storage pipe 49 are always lined up in the order of the predetermined sense of their polarity, so that it is always possible to supply the diode 1 having the predetermined sense from the parts discharge opening 52 to the parts carrying head.

If it is desired to change the sense of the polarity of the diodes 1, that is achieved by merely changing anodes 27 and 30 to cathodes, and cathodes 28 and 29 to anodes. Alternatively, a switch may be provided for the above change-over performance. The defective diodes or the other parts, such as resistances and condensers are detected and can be eliminated.

If the delivery of the diodes to the part carrying head should be delayed, the pipe 49 would be filled with the diodes successively fed thereto. At that time, the upper end of the uppermost diode fed to the pipe 49 is protruded from the pipe 49 and remains in the parts overturning member 38, so that the reciprocating rod 11 is prevented from returning to the upper position thereof. Thereby, the reciprocating rod 11 is not pressed by the press member 12, if the press member 12 is moved up and down, so that serious drawbacks are not encountered in the apparatus.

According to the embodiment of this invention, the following effects are obtained:

(1) It is possible to deliver the diodes, the polarity of which has been arranged in a predetermined sense, to the parts carrying head.

(2) The sense of the polarity of the diodes delivered to the parts carrying head, can be changed easily.

(3) Defective diodes and the parts of different kinds are detected and eliminated, so that only the good diodes can be delivered.

(4) The detection is performed by the two pairs of electrodes 27 and 29, 28 and 30, so that the accuracy of the detection becomes high, and high reliability of the apparatus is obtained.

(5) The electromagnets 35 and 48 are used as driving means, so that the burden of the power source can be lightened due to economy of the electric power.

(6) As the apparatus mainly consists of the supporting member 7 and magazine 6 which are moved up and down, and the two rotating members 25 and 38, the construction thereof is simple and is favorable for making the apparatus compact, and further, the reliability of the apparatus is high, because serious drawbacks are scarcely encountered in the apparatus.

We claim as our invention:

1. An apparatus for supplying electronic parts having two ends and a terminal at each of said ends and having a polarity, comprising:
    a first passage through which electronic parts are supplied;
    a first rotating member having a radially extending parts receiving hole for receiving said electronic parts one by one supplied from said first passage;
    a plurality of electrodes which are arranged in the vicinity of the ends of said parts-receiving hole that moves as said first rotating member is rotated, and which respectively come in contact with both end terminals of said electronic part in said parts receiving hole so as to detect the polarity of the electronic part;
    a second rotating member having a through hole in which said electronic part fed from said parts receiving hole is inserted when said first rotating member is rotated to a predetermined position, and which rotates in timed relation to rotation of said first rotating member;
    means for selectively preventing said electronic part from passing through said through hole responsive to signals generated in a detector including said electrodes; and
    a second passage for receiving said electronic part directly, when said electronic part passes through said through hole, and for receiving said electronic part after said second rotating member is rotated to a predetermined position when said electronic part is selectively prevented from passing through said through hole.

2. An apparatus for supplying electronic parts having two ends and a terminal at each of said ends and having a polarity comprising:
    a first passage through which electronic parts are supplied;
    an annular rotating member having a radially extending parts receiving hole for receiving said electronic parts one by one supplied from said first passage;
    a plurality of electrodes which are arranged in the vicinity of the ends of said parts receiving hole, and which respectively come in contact with both ends of said electronic part in said parts receiving hole so as to detect the polarity of said electronic part;
    a second passage and a third passage for receiving said electronic part fed from said parts receiving hole when said rotating member is rotated to a predetermined position; and
    means arranged between said rotating member and said seond and third passages, and delivering said electronic part fed from said parts receiving hole selectively to said second passage or to said third passage due to signals generated in a detector including said electrodes.

* * * * *